(12) United States Patent
Feng et al.

(10) Patent No.: US 9,190,360 B2
(45) Date of Patent: Nov. 17, 2015

(54) PHOTORESIST COLLAPSE METHOD FOR FORMING A PHYSICAL UNCLONABLE FUNCTION

(71) Applicant: International Business Machines Corporation, Armonk, NY (US)

(72) Inventors: Kai D. Feng, Hopewell Junction, NY (US); Wai-Kin Li, Beacon, NY (US); Ping-Chuan Wang, Hopewell Junction, NY (US); Zhijian Yang, Stormville, NY (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

(21) Appl. No.: 14/181,960

(22) Filed: Feb. 17, 2014

(65) Prior Publication Data

US 2015/0235964 A1    Aug. 20, 2015

(51) Int. Cl.
*H01L 21/66* (2006.01)
*H01L 23/544* (2006.01)
*H01L 21/3105* (2006.01)
(Continued)

(52) U.S. Cl.
CPC ........ *H01L 23/544* (2013.01); *H01L 21/31058* (2013.01); *H01L 22/34* (2013.01); *H01L 23/522* (2013.01); *H01L 23/5221* (2013.01); *H01L 23/5226* (2013.01); *H01L 23/5228* (2013.01); *H01L 23/5386* (2013.01); *H01L 2223/54433* (2013.01); *H01L 2224/05097* (2013.01)

(58) Field of Classification Search
CPC ....... H01L 22/34; H01L 23/52; H01L 23/522; H01L 23/5221; H01L 23/5226; H01L 23/5228; H01L 23/535; H01L 23/5386; H01L 2223/54433; H01L 2224/0616; H01L 2224/05097
See application file for complete search history.

(56) References Cited

U.S. PATENT DOCUMENTS

| | | |
|---|---|---|
| 2008/0256600 A1 | 10/2008 | Scrijen et al. |
| 2009/0222672 A1 | 9/2009 | Clarke et al. |
| 2011/0163088 A1 | 7/2011 | Besling et al. |

(Continued)

OTHER PUBLICATIONS

U.S. Appl. No. 13/570,972, filed Aug. 9, 2012, First Named Inventor: Daniel C. Edelstein, Title: "Structure with Sub-Lithographic Random Conductors as a Physical Unclonable Function".

(Continued)

*Primary Examiner* — Thanhha Pham
(74) *Attorney, Agent, or Firm* — Scully, Scott, Murphy & Presser, P.C.

(57) ABSTRACT

An organic material layer is lithographically patterned to include a linear array portion of lines and spaces. In one embodiment, the organic material layer can be an organic planarization layer that is patterned employing a photoresist layer, which is consumed during patterning of the organic planarization layer. Volume expansion of the organic planarization layer upon exposure to a halogen-including gas causes portions of the linear array to collapse at random locations. In another embodiment, the height of the photoresist layer is selected such that the linear array portion of the photoresist layer is mechanically unstable and produces random photoresist collapses. The pattern including random modifications due to the collapse of the organic material layer is transferred into an underlying layer to generate an array of conductive material lines with random electrical disruption of shorts or opens. The structure with random shorts can be employed as a physical unclonable function.

9 Claims, 12 Drawing Sheets

(51) Int. Cl.
*H01L 23/522* (2006.01)
*H01L 23/538* (2006.01)

(56) References Cited

U.S. PATENT DOCUMENTS

2011/0254141 A1  10/2011  Roest et al.
2013/0233608 A1   9/2013  Feng et al.

OTHER PUBLICATIONS

Sreedhar, A. et al., "Physically Unclonable Functions for Embedded Security based on Lithographic Variation" Proc. Design, Automation & Test in Europe Conference & Exhibition (Mar. 14-18, 2011) pp. 1-6.

Puntin, D. et al., "CMOS unclonable system for secure authentication based on device variability" Proc. 34th European Solid State Circuits Conference (Sep. 15-19, 2008) pp. 130-133.

Ju, J. et al., "Bit String Analysis of Physical Unclonable Functions based on Resistance Variations in Metals and Transistors" IEEE Journal of Solid-State Circuits (Jun. 3-4, 2012) pp. 13-20.

Gassend, B. et al., "Silicon Physical Random Functions" Proceedings of the 9th ACM conference on Computer and communications security (Nov. 2002) pp. 148-160.

Li, J. et al., "At-Speed Delay Characterization for IC Authentication and Trojan Horse Detection" Proc. of the IEEE International Workshop on Hardware-Oriented Security and Trust (Jun. 9, 2008), pp. 8-14.

Alkabani, Y. et al., "Trusted Integrated Circuits: A Nondestructive Hidden Characteristics Extraction Approach" Proc. of 10th International Workshop on Information Hiding, Lecture Notes in Computer Science (May 19-21, 2008) pp. 102-117, vol. 5284.

Su, Y. et al., "A Digital 1.6 pJ/bit Chip Identification Circuit Using Process Variations" IEEE Journal of Solid-State Circuits (Jan. 2008) pp. 69-77, vol. 43, No. 1.

Lofstrom, K. et al., "IC identification circuit using device mismatch" Digest of Technical Papers. ISSCC. 2000 IEEE International Solid-State Circuits Conference (Feb. 9, 2000) pp. 372-373.

Lin, L. et al., "Low-Power Sub-Threshold Design of Secure Physical Unclonable Functions" Proc. 2010 ACM/IEEE International Symposium on Low-Power Electronics and Design (ISLPED) (Aug. 18-20, 2010) pp. 43-48.

Merli, D. et al., "Improving the Quality of Ring Oscillator PUFs on FPGAs" Proceedings of the 5th ACM Workshop on Embedded Systems Security (Oct. 2010) pp. 9-17.

Maeda, S. et al., "An Artificial Fingerprint Device (AFD): A Study of Identification Number Applications Utilizing Characteristics Variation of Polycrystalline Silicon TFTs" IEEE Transaction on Electron Devices (Jun. 2003) pp. 1451-1458, vol. 50, No. 6.

Seino, Y. et al., "Sub-45nm Resist Process Using Stacked-Mask Process" Proc. of SPIE Advances in Resist Materials and Processing Technology XXV (Mar. 26, 2008) pp. 69232O-1-69232O-8, vol. 6923.

Kumar, S. et al., "The Butterfly PUF: Protecting IP on every FPGA" IEEE International Workshop on Hardware Oriented Security and Trust (Jun. 9, 2008) pp. 67-70.

Fitzpatrick, T., Magneprint technology licensed to TRAX Systems, Inc. (Nov. 11, 2004) http://news-info.wustl.edu/tips/page/normal/4159.html.

PHOTORESIST COLLAPSE METHOD FOR FORMING A PHYSICAL UNCLONABLE FUNCTION

BACKGROUND

The present disclosure relates to a secure electronic structure, and particularly to a structure containing random conductors as a physical unclonable function (PUF) and methods for manufacturing the same.

The ability to identify each electronic system uniquely is a useful feature for electronic security purposes. For example, identification of computers, personal hand held devices, cellular phones, chip cards, and other devices that contain sensitive information can be linked to a security feature of data or software in order to prevent unwarranted breach of security. Developers of electronic systems continuously strive to provide systems and methods that make their products impervious to unauthorized access or use. Communication devices used in the military and security fields are one category of devices that must remain secure despite physical and electrical tampering, while other categories also require this feature.

One approach to solve the above identified problems is to employ a physical unclonable function (PUF) to provide a unique, secure bit, word or function for use in generating security keys. A PUF refers to a structure implementing a random logic that is not reproducible among devices manufactured employing a same process. A PUF may eliminate the need for storage of a public or private key on a device. PUFs are known in the art to be implemented by circuits, components, processes or other entities capable of generating an output, such as a digital bit, word or a function that is resistant to cloning.

While PUFs are useful for security purposes, controlling the manufacturing cost for semiconductor chips is an important issue. In order to minimize the additional cost associated with manufacture of PUFs, it is desirable to fabricate the PUF during standard integrated circuit manufacturing without adding, or minimizing the number of, additional process steps in order to provide the benefit of the PUFs with no, or minimal, increase in the manufacturing cost.

SUMMARY

An organic material layer is lithographically patterned to include a linear array portion of lines and spaces. In one embodiment, the organic material layer can be an organic planarization layer that is patterned employing a photoresist layer, which is consumed during patterning of the organic planarization layer. The height of the organic planarization layer is selected such that volume expansion of the organic planarization layer upon exposure to a halogen-including gas causes portions of the linear array to collapse at random locations. In another embodiment, the height of the photoresist layer is selected such that the linear array portion of the photoresist layer is mechanically unstable and produces random photoresist collapses. The pattern of the linear array with random modifications due to the collapse of the organic planarization layer or the photoresist layer is transferred into an underlying layer to generate an array of conductive material lines with random electrical shorts or opens. The structure with random shorts can be employed as a physical unclonable function.

According to an aspect of the present disclosure, a method of forming an electronic structure is provided. A vertical stack including an organic planarization layer and a photoresist layer is formed over a substrate. The photoresist layer is lithographically patterned with a lithographic pattern that includes a linear periodic array of lines having a uniform width. The organic planarization layer is patterned by transferring a pattern in the photoresist layer into the organic planarization layer. The patterned organic planarization layer is randomly collapsed in at least one location by exposing the patterned organic planarization layer to a halogen-including gas. A pattern of the randomly collapsed organic planarization layer is transferred into a material layer within the substrate.

According to another aspect of the present disclosure, a method of forming an electronic structure is provided. A photoresist layer is formed over a substrate. The photoresist layer is lithographically exposed with a lithographic pattern that includes a linear periodic array of lines having a uniform width. The photoresist layer is developed while remaining portions of the photoresist layer randomly collapse in at least one location during development. A pattern of the developed and randomly collapsed photoresist layer is transferred into a layer within the substrate.

According to yet another aspect of the present disclosure, an electronic structure including an electrical connection structure is located in a substrate. The electrical connection structure contains a randomly electrically disrupted connection region including a plurality of randomly electrically disrupted conductive material lines. The plurality of randomly electrically disrupted conductive material lines includes at least one variable-width conductive material line extending generally along a lengthwise direction. The electrical connection structure further contains a first access node region including first access conductive material lines configured to access one end of each of the plurality of randomly electrically disrupted conductive material lines and not including electrical shorts therein. In addition, the electrical connection structure contains a second access node region including second access conductive material lines configured to access another end of each of the plurality of randomly electrically disrupted conductive material lines and not including electrical shorts therein.

DETAILED DESCRIPTION

Figure 1A:
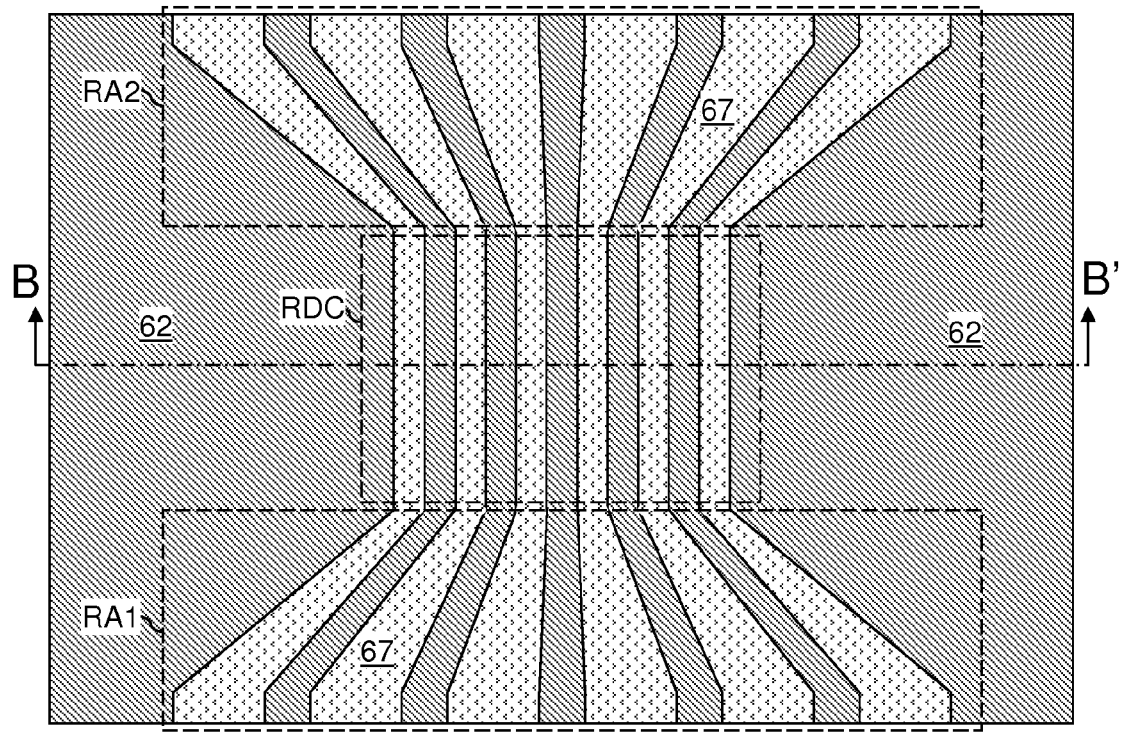
FIG. 1A is a top-down view of a first exemplary structure after patterning a photoresist layer according to a first embodiment of the present disclosure.

As stated above, the present disclosure relates to a structure containing random conductors as a physical unclonable function (PUF) and methods for manufacturing the same. Aspects of the present disclosure are now described in detail with accompanying figures. Throughout the drawings, the same reference numerals or letters are used to designate like or equivalent elements. The drawings are not necessarily drawn to scale. As used herein, ordinals are employed merely to distinguish similar elements, and different ordinals may be employed to designate a same element in the specification and/or claims.

Figure 1B:
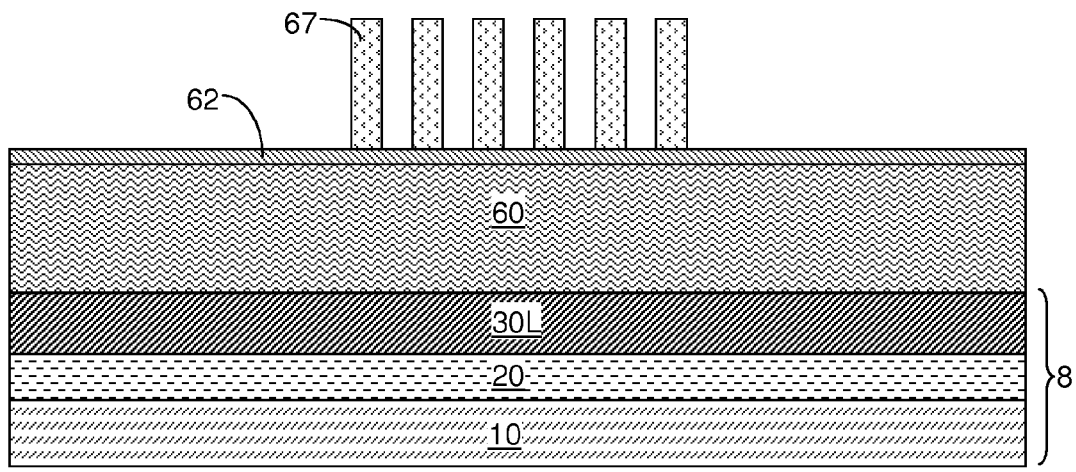
FIG. 1B is a vertical cross-sectional view of the first exemplary structure of FIG. 1A.

Referring to FIGS. 1A and 1B, a first exemplary structure according to a first embodiment of the present disclosure includes a substrate 8 and a vertical stack including an organic planarization layer 60, an antireflective coating (ARC) layer 62, and a patterned photoresist layer 67. The substrate 8 can include a stack, from bottom to top, of a handle substrate 10, an insulator layer 20, and a conductive material layer 30L.

The handle substrate 10 can include a semiconductor material, a conductive material, a dielectric material, or a combination thereof. The handle substrate 10 can be sufficiently thick to provide mechanical support for the insulator layer 20 and the conductive material layer 30L. For example, the handle substrate 10 can have a thickness in a range from 30 microns to 1 mm, although lesser and greater thicknesses can also be employed.

The insulator layer 20 includes a dielectric material such as silicon oxide, silicon nitride, sapphire, or a combination thereof. The thickness of the insulator layer 20 can be from 10 nm to 1 micron, although lesser and greater thicknesses can also be employed. In one embodiment, the insulator layer 20 can be a shallow trench isolation structure as known in the art, or a buried insulator layer in a semiconductor-on-insulator substrate as known in the art. In one embodiment, the insulator layer 20 can include a plurality of dielectric material layers such as a stack of a shallow trench isolation structure and a gate dielectric layer. Alternatively, the insulator layer 20 can be one of wiring-level dielectric material layers for forming metal interconnect structures therein or thereupon.

The conductive material layer 30L can include any conductive material. For example, the conductive material layer 30L can include a material selected from doped polysilicon, a copper alloy including at least 90% of copper in atomic concentration, an aluminum alloy including at least 90% of aluminum in atomic concentration, and a tungsten alloy including at least 90% of tungsten in atomic concentration. In one embodiment, the conductive material layer 30L can be a heavily doped portion of a top semiconductor layer in a semiconductor-on-insulator substrate, or can be a gate conductor layer formed over a gate dielectric layer as known in the art. Alternatively, the conductive material layer 30L can be one of wiring level metallic material layers for forming metal interconnect structures therefrom. The thickness of the conductive material layer 30L can be in a range from 10 nm to 1 micron, although lesser and greater thicknesses can also be employed.

The organic planarization layer (OPL) 60 includes an organic polymer material having a viscosity that is low enough to allow flowing of the organic polymer material and formation of a self-planarizing top surface. The OPL 60 can include an organic planarizing material employed for trilayer lithography as known in the art. The OPL 60 can be formed by spin coating, and can have a thickness in a range from 300 nm to 1,000 nm, although lesser and greater thicknesses can also be employed. The thickness of the OPL 60 is selected such that patterned portions of the OPL 60 does not collapse without additional modification, but is prone to collapse at random locations upon a volume change in the patterned portions of the OPL in a subsequent processing step.

The ARC layer 62 can include any antireflective coating material as known in the art, and can have a thickness in a range from 10 nm to 100 nm, although lesser and greater thicknesses can also be employed.

The patterned photoresist layer 67 can be formed by applying a blanket photoresist layer over the ARC layer 62, and lithographically exposing and developing the blanket photoresist layer. As used herein, a blanket photoresist layer refers to a photoresist layer without any pattern therein. The blanket photoresist layer is formed with a uniform thickness throughout. The blanket photoresist layer can include a positive tone photoresist material or a negative tone photoresist material. The lithographic exposure and development of the blanket photoresist layer can be performed employing lithographic methods as known in the art.

The blanket photoresist layer is lithographically patterned with a lithographic pattern. The lithographic pattern can include a linear array of lines generally extending along a same direction. In one embodiment, the lithographic pattern can include lines having a uniform width. In one embodiment, the lithographic pattern can include a linear periodic array of lines having a uniform width, first non-periodic lines attached to one end of each of the linear periodic array of lines and including portions wider than the linear periodic array of lines, and second non-periodic lines attached to another end of each of the linear periodic array of lines and including portions wider than the linear periodic array of lines.

The linear periodic array of lines is located within a region herein referred to as a randomly electrically disrupted connection region RDC, in which random electrical shorts are to be formed in a subsequent processing step. As used herein, a linear periodic array refers to a one-dimensional array in which a pattern is repeated along a direction with a constant periodicity. As used herein, a linear periodic array of lines refers to a linear periodic array in which a repeated pattern is a pattern including a line of a constant width and a space of another constant width. As used herein, a line refers to a three-dimensional physical structure having a horizontal top surface and a horizontal bottom surface, having a pair of parallel or non-parallel sidewalls, and predominantly extending along one horizontal direction than other horizontal directions or a vertical direction. As used herein, a width of a line is constant if the width is invariant under translation along a lengthwise direction of the line.

The first non-periodic lines are to be formed in a first access node region RA1. The first access node region RA1 includes line patterns that are contiguously connected to the linear periodic array of lines. In one embodiment, the first non-periodic lines can have a "fan out" configuration," in which the width of the first non-periodic lines increase with the distance from the linear periodic array of lines, and the lateral extent of the first non-periodic lines increases with the distance from the linear periodic array of lines. The second non-periodic lines are to be formed in a second access node region RA2. The second access node region RA2 includes line patterns that are contiguously connected to the linear periodic array of lines. In one embodiment, the second non-periodic lines can have a fan out configuration, in which the width of the second non-periodic lines increase with the distance from the linear periodic array of lines, and the lateral extent of the second non-periodic lines increases with the distance from the linear periodic array of lines.

Figure 2A:
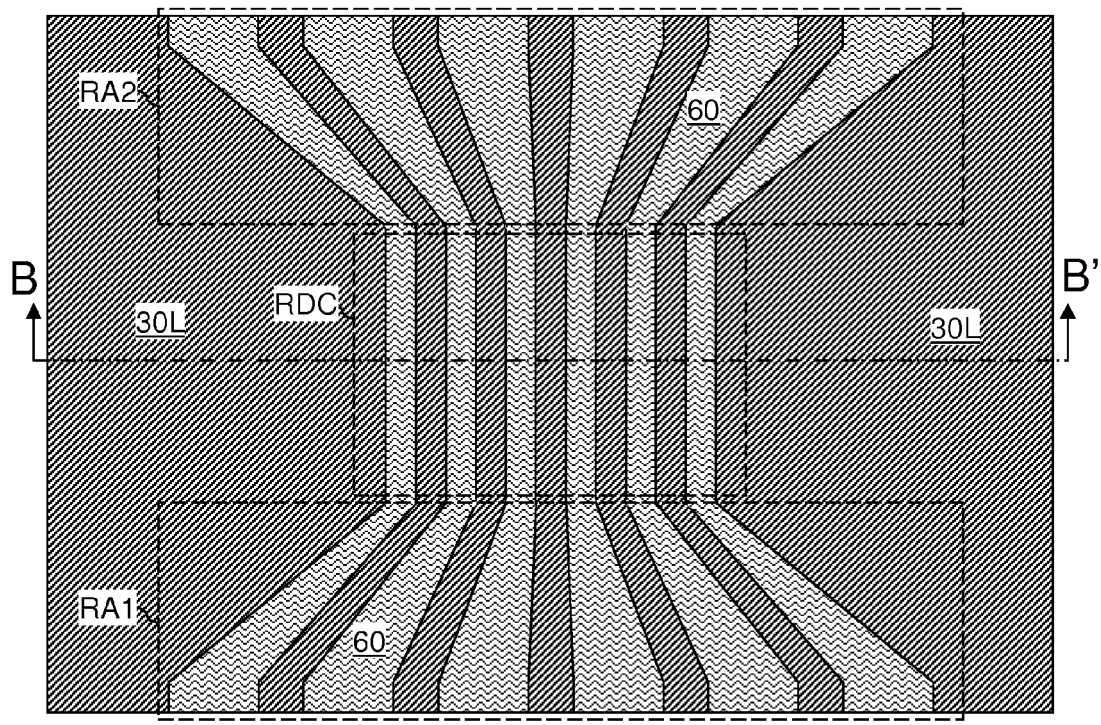
FIG. 2A is a top-down view of the first exemplary structure after transfer of the pattern in the photoresist layer into an organic planarization layer according to the first embodiment of the present disclosure.
Figure 2B:
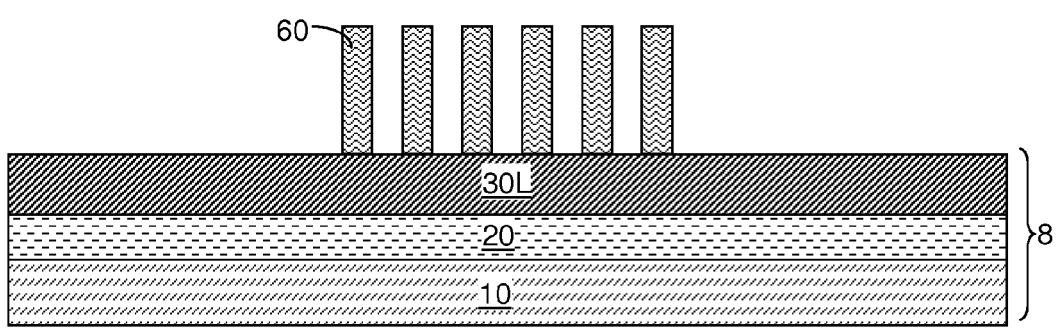
FIG. 2B is a vertical cross-sectional view of the first exemplary structure of FIG. 2A.

Referring to FIGS. 2A and 2B, the pattern in the patterned photoresist layer 67 is transferred through the ARC layer 62 and into the OPL 60 by an anisotropic etch. The patterned photoresist layer 67 and/or patterned portions of the ARC layer 62 can be consumed during the anisotropic etch that patterns the OPL 60. In one embodiment, the anisotropic etch can be selective to the conductive material layer 30L. The pattern in the patterned photoresist layer 67 is replicated within the remaining portions of the OPL 60.

Figure 3A:
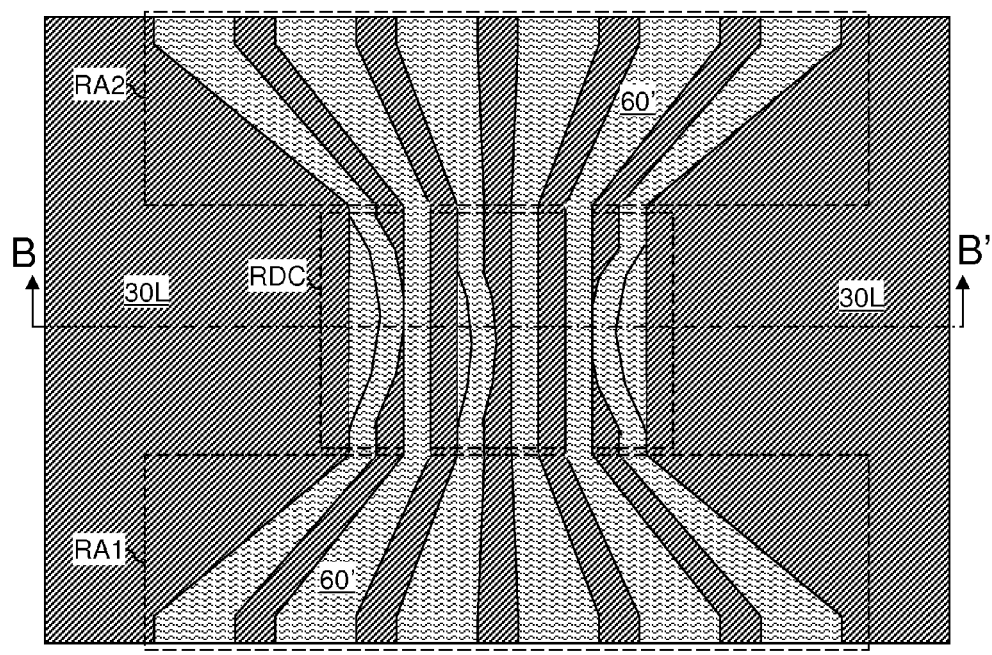
FIG. 3A is a top-down view of the first exemplary structure after inducing random collapse of portions of the patterned organic planarization layer according to the first embodiment of the present disclosure.
Figure 3B:
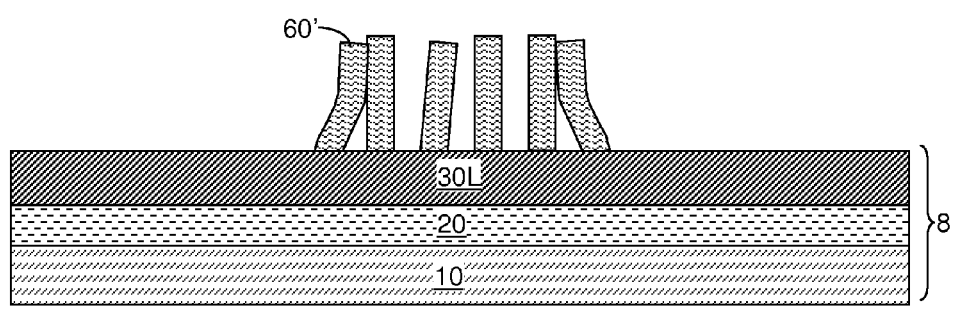
FIG. 3B is a vertical cross-sectional view of the first exemplary structure of FIG. 3A.

Referring to FIGS. 3A and 3B, random collapse of portions of the patterned organic planarization layer 60 is induced. In one embodiment, the random collapse of the portions of the patterned organic planarization layer 60 may be induced after the processing steps of FIGS. 2A and 2B in a separate processing step that exposes surfaces of the patterned organic planarization layer 60 to a halogen-including gas. In another embodiment, the random collapse of the portions of the patterned organic planarization layer 60 may be induced concurrently with the processing steps of FIGS. 2A and 2B, i.e., during the anisotropic etch that defines the patterned organic planarization layer 60. In this case, a randomly collapsed organic planarization layer 60' as illustrated in FIGS. 3A and 3B may be formed during the anisotropic etch that patterns the organic planarization layer 60 without formation of the patterned organic planarization layer 60 as illustrated in FIGS. 2A and 2B.

The patterned organic planarization layer 60 is caused to randomly collapse in at least one location by exposing the patterned organic planarization layer 60 to the halogen-including gas. The halogen-including gas may be provided in a process chamber including the first exemplary structure in a plasma form, or may be present in a gaseous form without plasma.

In one embodiment, the halogen-including gas can be selected from hydrofluorocarbon gases such as $CHF_3$, fluorine gas, hydrofluoric acid vapor, a halogen fluoride gas, chlorine gas, and hydrochloric acid vapor. In one embodiment, the halogen-inducing gas can be fluorine gas. The partial pressure of the halogen-including gas can be in a range from 1 mTorr to 10 Torr, although lesser and greater partial pressures can also be employed. An inert gas such as nitrogen can be included within the ambient including the halogen-including gas. The total pressure of the ambient during exposure to the halogen-including gas can be in a range from 1 mTorr to 760 Torr, although lesser or greater total pressures can also be employed. The temperature of the patterned organic planarization layer 60 during exposure to the halogen-including gas can be from 0 degrees Celsius to 200 degrees Celsius, although lower and higher temperatures may also be employed provided that the organic planarizing material of the organic planarization layer 60 does not burn and does not freeze. If the halogen-including gas is applied in plasma form, the RF power of the plasma can be adjusted to enhance the incorporation of the halogen atoms into the organic planarization layer 60. An example of incorporation of a halogen atom into an organic planarizing material is described in Seino et al., Advances in Resist Materials and Processing Technology XXV, Proc. of SPIE Vol. 6923, 69232O, (2008).

During exposure to the halogen-including gas, hydrogen atoms in the patterned organic planarization layer 60 are randomly replaced with halogen atoms within the halogen-including gas. The random replacement of the hydrogen atoms with the halogen atoms causes random volume changes within the patterned organic planarization layer 60, which becomes randomly collapsed organic planarization layer 60'. At least one line in the patterned organic planarization layer 60 is induced to collapse. In one embodiment, at least another line in the patterned organic planarization layer can remain standing. In one embodiment, a first set of lines may collapse, and a second set of lines may remain standing. In another embodiment, all of the lines may collapse with, or without, touching neighboring lines. As used herein, a "halogenated" patterned organic planarization layer refers to a patterned organic planarization layer of which the organic planarizing material therein acquires more halogen atoms than before a halogenation process such as exposure to a halogen-including gas. The atomic content of halogen atoms within the randomly collapsed organic planarization layer 60' can be in a range from 0.5% to 10%, although lesser and greater atomic percentages can also be employed.

The distribution of volume expansion due to exposure to the halogen-including gas is not uniform, and causes local changes in volume within the randomly collapsed organic planarization layer 60'. The local changes in the volume of the randomly collapsed organic planarization layer 60' causes collapse of the randomly collapsed organic planarization layer 60' at random locations. For example, the portion of the randomly collapsed organic planarization layer 60' within the randomly electrically disrupted connection region RDC corresponds to the linear periodic array of patterned organic planarization layer 60 prior to halogenation. The portion of the randomly collapsed organic planarization layer 60' within the randomly electrically disrupted connection region RDC can include collapsed portions of the randomly collapsed organic planarization layer 60', in which a line portion of the randomly collapsed organic planarization layer 60' collapses onto a neighboring line portion of the randomly collapsed organic planarization layer 60' during the halogenation process.

In one embodiment, at least one of the line portions of the randomly collapsed organic planarization layer 60' within the randomly electrically disrupted connection region RDC does not collapse, i.e., stands as a structure having a shape of a rectangular parallelepiped or does not tilt to a degree to contact a neighboring line portion of the randomly collapsed organic planarization layer 60'. In one embodiment, relevant processing parameters can be selected such that the portion of the randomly collapsed organic planarization layer 60' having the uniform width within the randomly electrically disrupted connection region RDC has a random probability of collapse in a range from 10% to 80%. The relevant processing parameters can include, for example, the composition and viscosity of the organic planarizing material prior to the halogenation process, the height of the organic planarization layer as formed at the processing step of FIGS. 1A and 1B, the width of the line patterns within the randomly electrically disrupted connection region RDC as formed in the patterned photoresist layer 67, and the process conditions of the halogenation process.

Figure 4A:
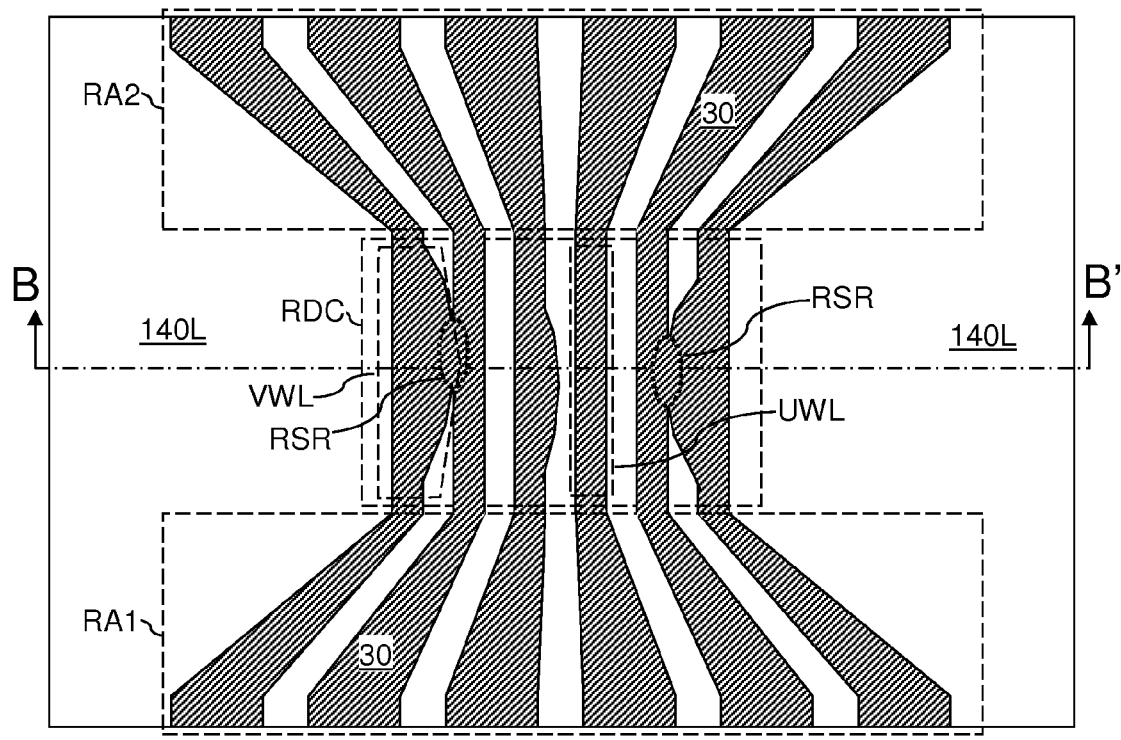
FIG. 4A is a top-down view of the first exemplary structure after transfer of the pattern in the randomly collapsed organic planarization layer into a conductive material layer and deposition and planarization of a dielectric material layer according to the first embodiment of the present disclosure.
Figure 4B:
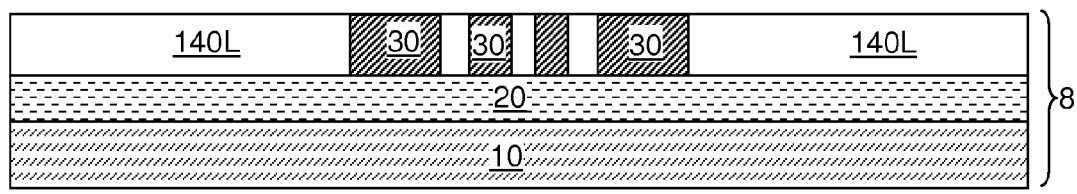
FIG. 4B is a vertical cross-sectional view of the first exemplary structure of FIG. 4A.

Referring to FIGS. 4A and 4B, the pattern in the randomly collapsed organic planarization layer 60' is transferred into the conductive material layer 30L by an anisotropic etch that employs the randomly collapsed organic planarization layer 60' as an etch mask. The collapsed portions of the randomly collapsed organic planarization layer 60' within the randomly electrically disrupted connection region RDC prevent the underlying portions of the conductive material layer 30L from being etched. Thus, the transfer of the pattern in the randomly collapsed organic planarization layer 60' into the conductive material layer 30L forms conductive material lines 30, which are conductors extending within a level defined between the top surface and the bottom surface of the conductive material layer 30L as provided at the processing steps of FIGS. 1A and 1B.

Optionally, a dielectric material layer 140L can be deposited over conductive material lines 30, i.e., the patterned portions of the conductive material layer 30L, and subsequently planarized, for example, by chemical mechanical planarization. The dielectric material layer 140L fills regions in which the conductive material layer 30L is not present. In other words, the dielectric material layer 140L and the conductive material layer 30L can complementarily fill a layer above the insulator layer 20L.

The first exemplary structure is an electronic structure including an electrical connection structure located in a substrate 8. The electrical connection structure contains a randomly electrically disrupted connection region RDC including a plurality of randomly electrically disrupted conductive material lines, i.e., the portions of the conductive material lines 30 within the randomly electrically disrupted connection region RDC. As used herein, an "electrically disrupted connection" refers to an electrical connection including at least one electrical short and/or at least one electrical open. As used herein, an "electrically disrupted connection region" refers to a region including electrical connections that are disrupted, i.e., electrical connections that include at least one electrical short and/or at least one electrical open. As used herein, a "randomly electrically disrupted connection region" refers to an electrically disrupted connection region in which at least one of the disrupted electrical connections is random, i.e., without controllability, predictability, or reproducibility. As used herein, "randomly electrically disrupted conductive material lines" refers to conductive material lines that provide electrically disrupted connections in which the disruptions are random.

The plurality of randomly electrically disrupted conductive material lines include at least one uniform-width conductive material line UWL extending along a lengthwise direction, and at least one variable-width conductive material line VWL extending generally along a direction parallel to the lengthwise direction and including portions having a greater width than the width of the at least one uniform-width line UWL. The plurality of randomly electrically disrupted conductive material lines can be embedded within the dielectric material layer 140L located in the substrate 8.

The electrical connection structure further includes a first access node region RA1 including first access conductive material lines (i.e., portions of the conductive material lines 30 within the first access node region RA1) configured to access one end of each of the plurality of randomly electrically disrupted conductive material lines and not including electrical shorts or electrical opens therein. The electrical connection structure further includes a second access node region RA2 including second access conductive material lines (i.e., portions of the conductive material lines 30 within the second access node region RA2) configured to access another end of each of the plurality of randomly electrically disrupted conductive material lines and not including electrical shorts or electrical opens therein.

An interface region between the randomly electrically disrupted connection region RDC and the first access node region RA1 can include a periodic repetition of first end portions of the plurality of randomly electrically disrupted conductive material lines. In other words, the effect of the OPL collapse may not be present at the interface region between the randomly electrically disrupted connection region RDC and the first access node region RA1. The periodic repetition of the first end portions of the plurality of randomly electrically disrupted conductive material lines can have the same width as the at least one uniform-width conductive material line UWL.

Likewise, an interface region between the randomly electrically disrupted connection region RDC and the second access node region RA2 can include a periodic repetition of second end portions of the plurality of randomly electrically disrupted conductive material lines. The effect of the OPL collapse may not be present at the interface region between the randomly electrically disrupted connection region RDC and the second access node region RA2. The periodic repetition of the second end portions of the plurality of randomly electrically disrupted conductive material lines can have the same width as the at least one uniform-width conductive material line UWL.

In one embodiment, the first access conductive material lines and the second access conductive material lines can have a greater width in regions distal from the randomly electrically disrupted connection region RDC than in regions proximal to the randomly electrically disrupted connection region RDC. In one embodiment, the plurality of conductive material lines 30 can include a material selected from doped polysilicon, a copper alloy including at least 90% of copper in atomic concentration, an aluminum alloy including at least 90% of aluminum in atomic concentration, and a tungsten alloy including at least 90% of tungsten in atomic concentration.

The randomly electrically disrupted connection region RDC includes at least one random short region RSR, in which a neighboring pair of conductive material lines 30 is merged to form an electrically shorted region. Such a neighboring pair of conductive material lines 30 is electrically shorted.

Figure 5A:
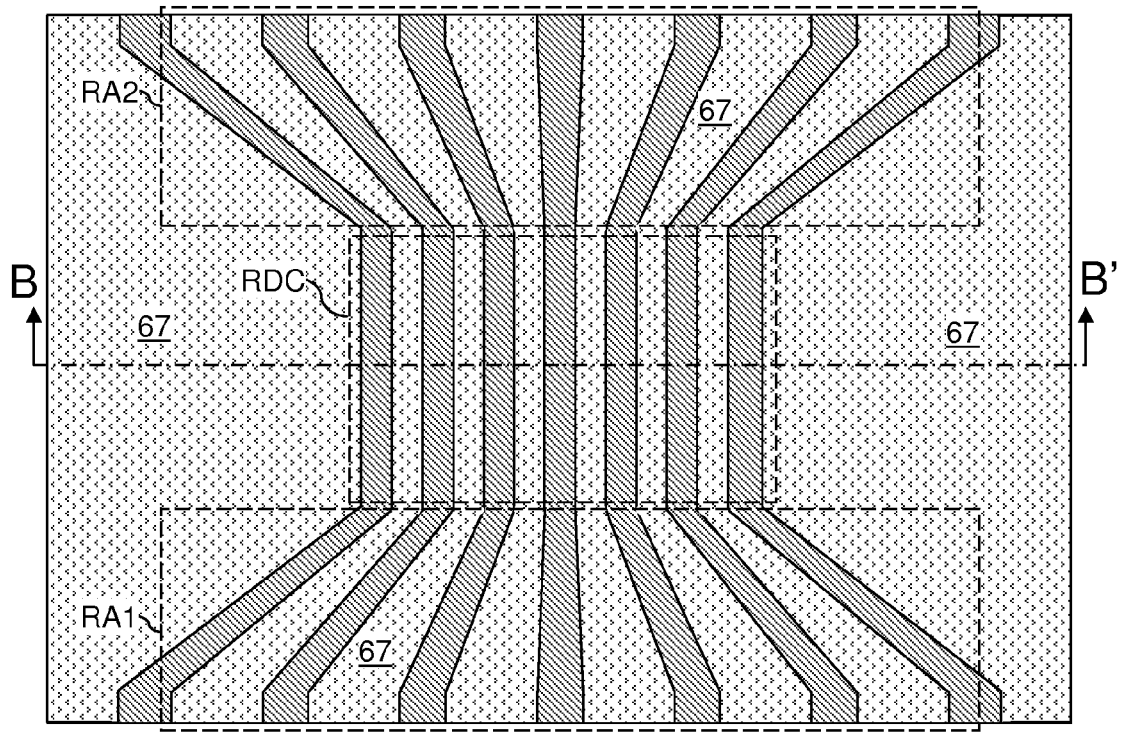
FIG. 5A is a top-down view of a second exemplary structure after patterning a photoresist layer according to a second embodiment of the present disclosure.
Figure 5B:
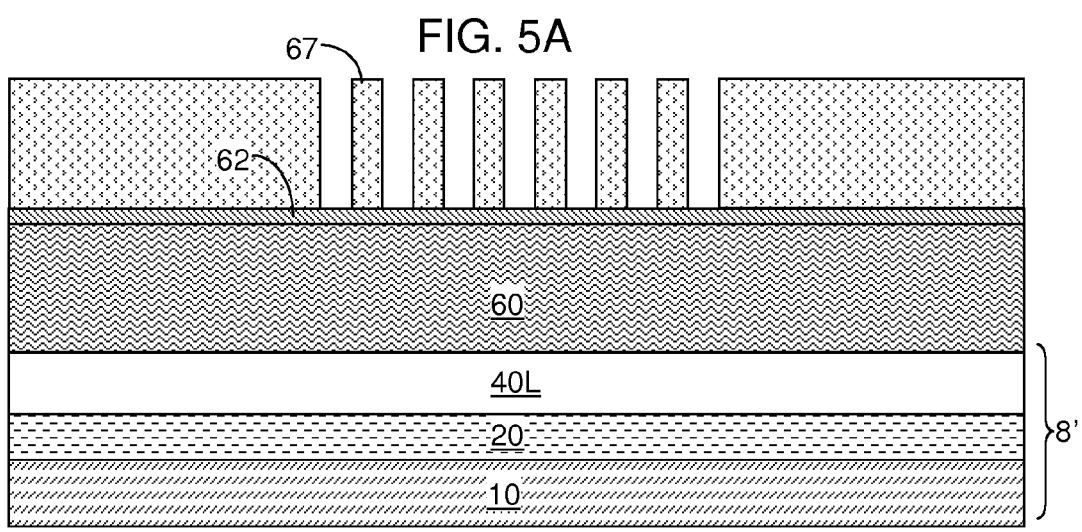
FIG. 5B is a vertical cross-sectional view of the second exemplary structure of FIG. 5A.

Referring to FIGS. 5A and 5B, a second exemplary structure according to a second embodiment of the present disclosure can be derived from the first exemplary structure by substituting a dielectric material layer 40L for a conductive material layer 30L in the first exemplary structure illustrated in FIGS. 1A and 1B. Thus, the substrate 8 of the first embodiment is replaced with a substrate 8' including a vertical stack of a handle substrate 10, an insulator layer 20, and a dielectric material layer 40L. Further, the pattern in the patterned photoresist layer 67 can be selected to provide openings in the patterned photoresist layer within regions in which subsequent formation of conductive material lines is desired.

Figure 6A:
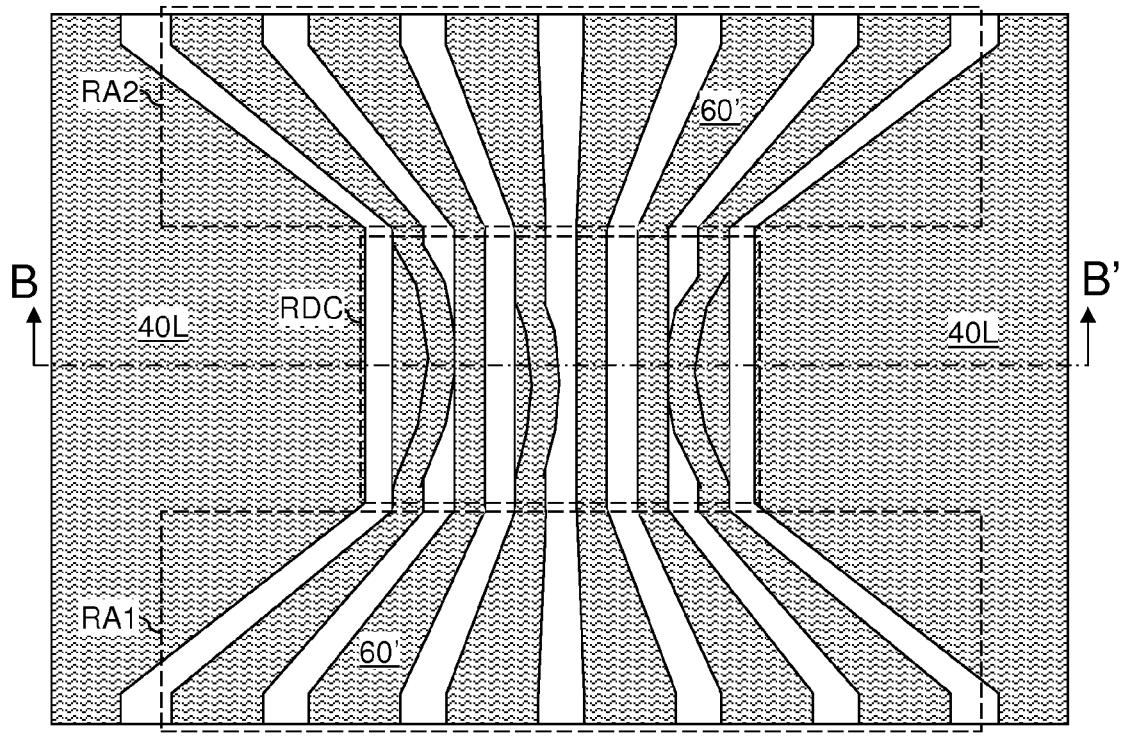
FIG. 6A is a top-down view of the second exemplary structure after transfer of the pattern in the photoresist layer into an organic planarization layer and inducing random collapse of portions of the patterned organic planarization layer according to the second embodiment of the present disclosure.
Figure 6B:
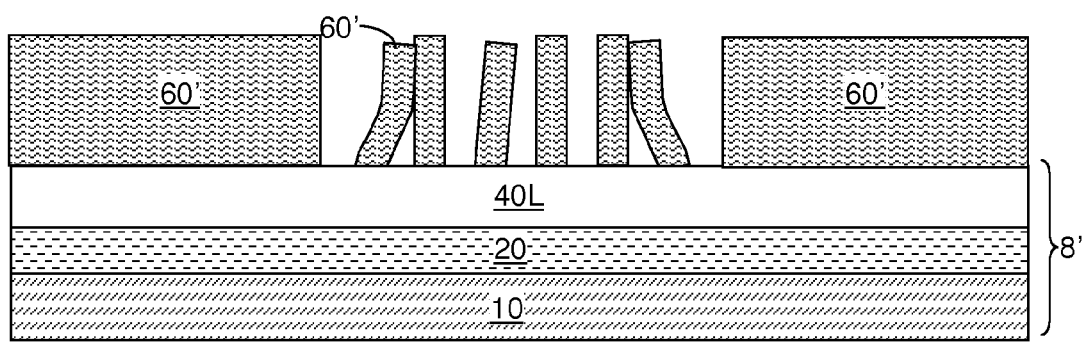
FIG. 6B is a vertical cross-sectional view of the second exemplary structure of FIG. 6A.

Referring to FIGS. 6A and 6B, the processing steps of FIGS. 2A, 2B, 3A, and 3B are sequentially performed to induce random collapse of portions of the patterned organic planarization layer 60 and to form the randomly collapsed organic planarization layer 60'. Only narrow portions of the patterned organic planarization layer 60 are prone to collapse, and regions having a greater width than minimum width of the patterned organic planarization layer 60 are not prone to collapse during the halogenation process. At least one line in the patterned organic planarization layer 60 is induced to collapse. In one embodiment, at least another line in the patterned organic planarization layer can remain standing. In one embodiment, a first set of lines may collapse, and a second set of lines may remain standing. In another embodiment, all of the lines may collapse with, or without, touching neighboring lines.

Figure 7A:
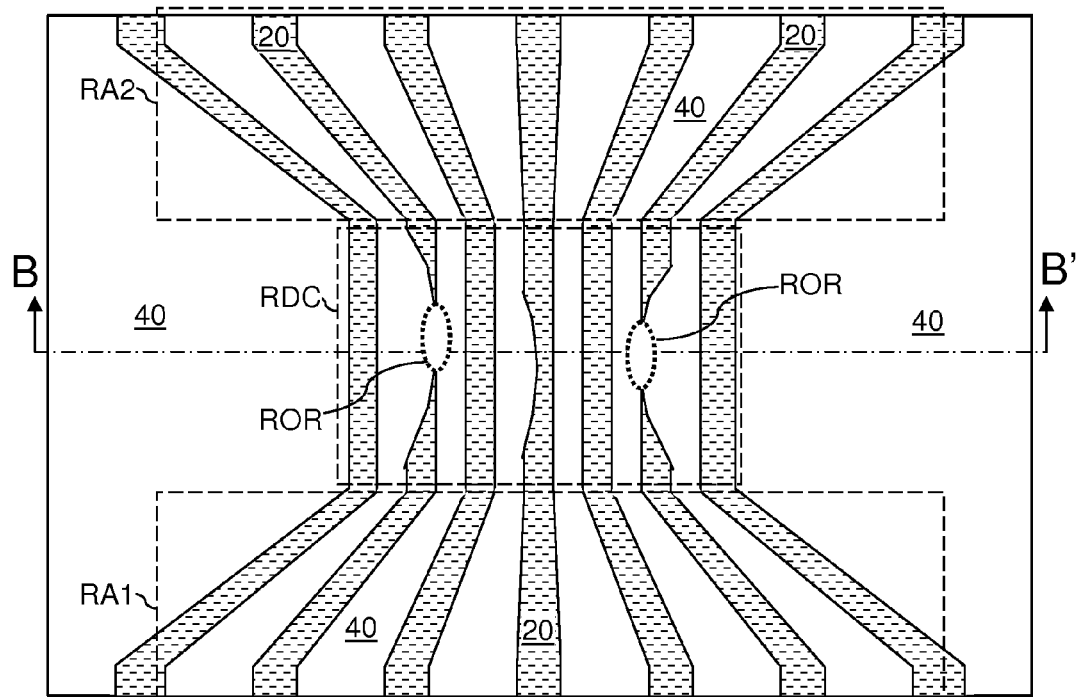
FIG. 7A is a top-down view of the second exemplary structure after transfer of the pattern in the randomly collapsed organic planarization layer into a dialectic material layer according to the second embodiment of the present disclosure.
Figure 7B:
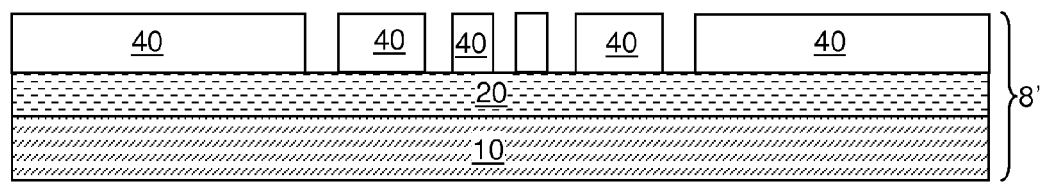
FIG. 7B is a vertical cross-sectional view of the second exemplary structure of FIG. 7A.

Referring to FIGS. 7A and 7B, the pattern in the randomly collapsed organic planarization layer 60' is transferred into the dialectic material layer 40L to form a patterned dielectric material layer 40. The patterned dielectric material layer 40 includes cavities, i.e., trenches, in areas in which the organic planarizing material of the randomly collapsed organic planarization layer 60' is not present during the anisotropic etch that performs the pattern transfer. The collapsed portions of the randomly collapsed organic planarization layer 60' within the randomly electrically disrupted connection region RDC prevent the underlying portions of the dielectric material layer 40L from being etched, i.e., prevents formation of a contiguous cavity underneath.

Figure 8A:
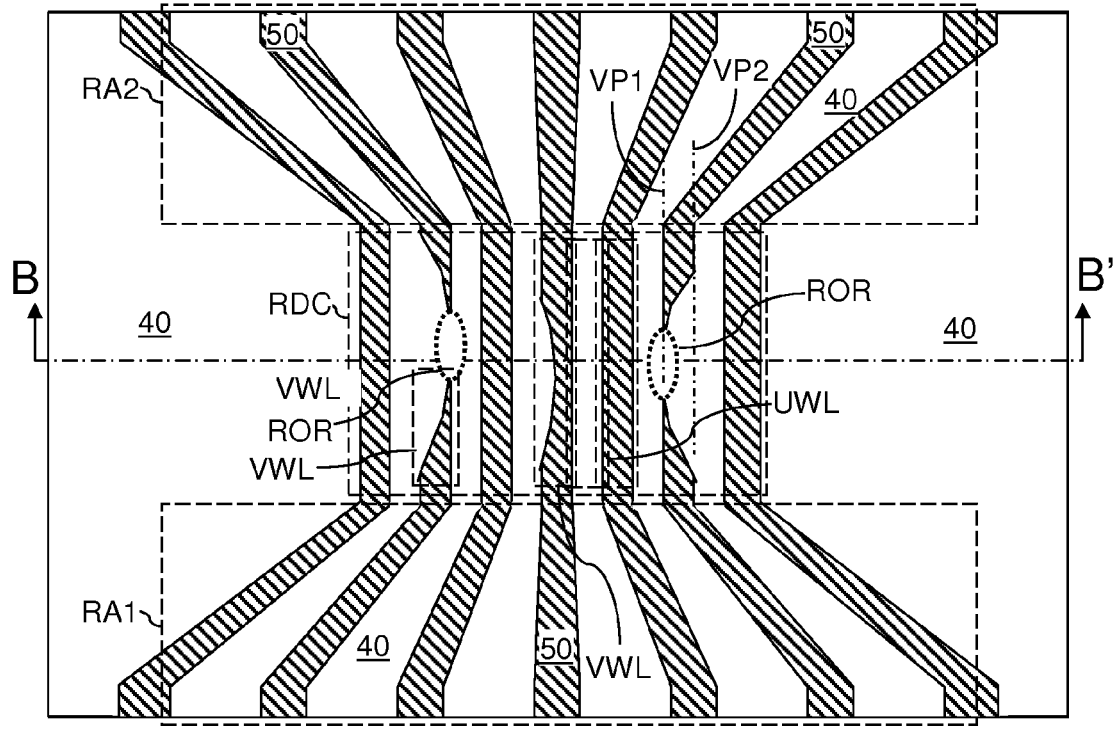
FIG. 8A is a top-down view of the second exemplary structure after formation of conductive material lines according to the second embodiment of the present disclosure.
Figure 8B:
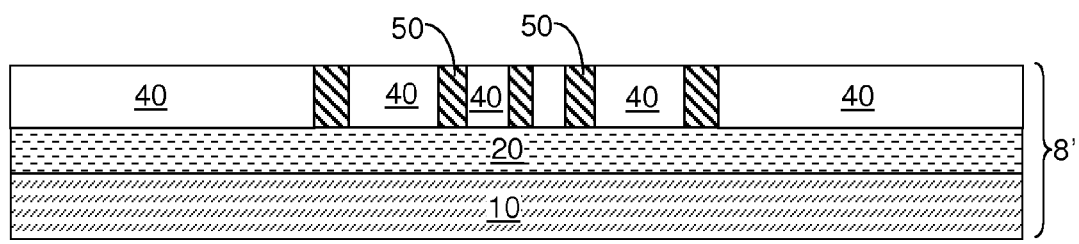
FIG. 8B is a vertical cross-sectional view of the second exemplary structure of FIG. 8A.

Referring to FIGS. 8A and 8B, the cavities within the patterned dielectric material layer 40 are filled with a conductive material to form conductive material lines 50. Excess portions of the conductive material can be removed from above the top surface of the patterned dielectric material layer 40, for example, by chemical mechanical planarization (CMP).

The second exemplary structure is an electronic structure including an electrical connection structure located in a substrate 8'. The electrical connection structure contains a randomly electrically disrupted connection region RDC including a plurality of randomly electrically disrupted conductive material lines, i.e., the portions of the conductive material lines 50 within the randomly electrically disrupted connection region RDC.

The plurality of randomly electrically disrupted conductive material lines include at least one uniform-width conductive material line UWL extending along a lengthwise direction, and at least one variable-width conductive material line VWL extending generally along a direction parallel to the lengthwise direction and including portions having a greater width than the width of the at least one uniform-width line UWL. The plurality of randomly electrically disrupted conductive material lines can be embedded within the dielectric material layer140L located in the substrate 8.

The electrical connection structure further includes a first access node region RA1 including first access conductive material lines (i.e., portions of the conductive material lines 50 within the first access node region RA1) configured to access one end of each of the plurality of randomly electrically disrupted conductive material lines and not including electrical shorts or electrical opens therein. The electrical connection structure further includes a second access node region RA2 including second access conductive material lines (i.e., portions of the conductive material lines 50 within the second access node region RA2) configured to access another end of each of the plurality of randomly electrically disrupted conductive material lines and not including electrical shorts or electrical opens therein.

An interface region between the randomly electrically disrupted connection region RDC and the first access node region RA1 can include a periodic repetition of first end portions of the plurality of randomly electrically disrupted conductive material lines. In other words, the effect of the OPL collapse may not be present at the interface region between the randomly electrically disrupted connection region RDC and the first access node region RA1. The periodic repetition of the first end portions of the plurality of randomly electrically disrupted conductive material lines can have the same width as the at least one uniform-width conductive material line UWL.

Likewise, an interface region between the randomly electrically disrupted connection region RDC and the second access node region RA2 can include a periodic repetition of second end portions of the plurality of randomly electrically disrupted conductive material lines. The effect of the OPL collapse may not be present at the interface region between the randomly electrically disrupted connection region RDC and the second access node region RA2. The periodic repetition of the second end portions of the plurality of randomly electrically disrupted conductive material lines can have the same width as the at least one uniform-width conductive material line UWL.

In one embodiment, the first access conductive material lines and the second access conductive material lines can have a greater width in regions distal from the randomly electrically disrupted connection region RDC than in regions proximal to the randomly electrically disrupted connection region RDC. In one embodiment, the plurality of conductive material lines 50 can include a material selected from doped polysilicon, a copper alloy including at least 90% of copper in atomic concentration, an aluminum alloy including at least 90% of aluminum in atomic concentration, and a tungsten alloy including at least 90% of tungsten in atomic concentration.

The randomly electrically disrupted connection region RDC includes at least one random open region ROR. Around each random open region ROR, a pair of electrically disconnected conductive material lines 50 is present. The pair of electrically disconnected conductive material lines 50 can include a pair of vertical sidewalls that are within a pair of parallel vertical planes (VP1, VP2) that extend along the lengthwise direction of conductive material lines that are not disconnected such as the at least one uniform-width conductive material line UWL.

Figure 9A:
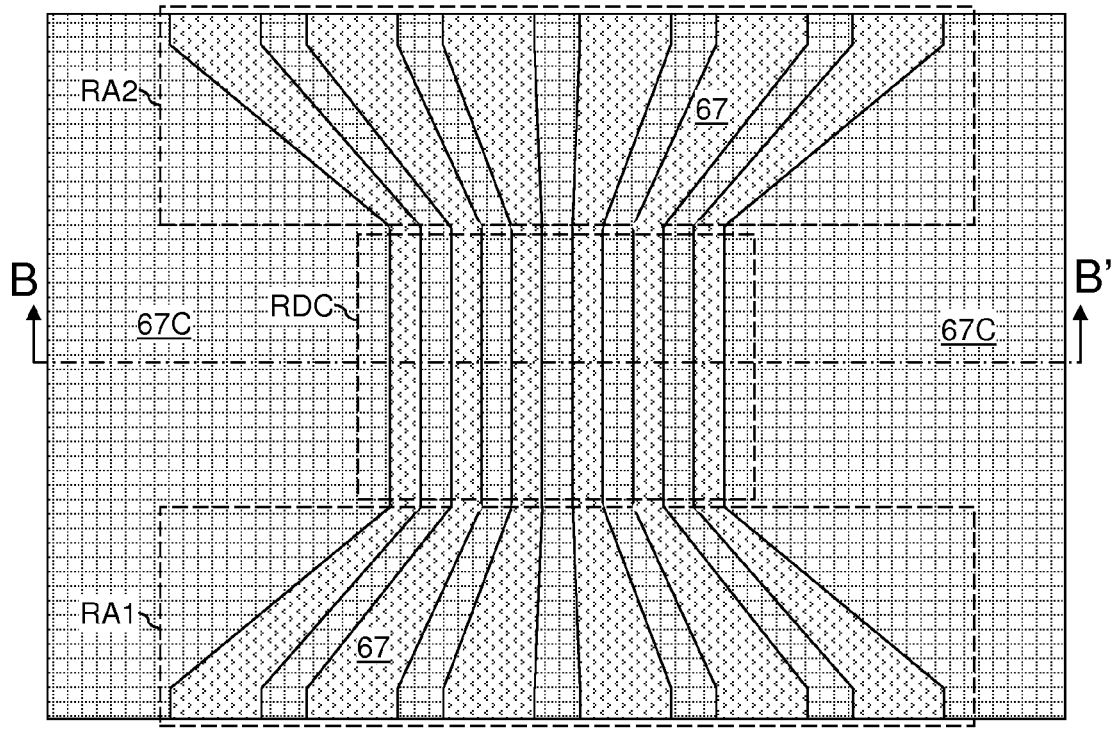
FIG. 9A is a top-down view of a third exemplary structure after lithographically exposing a photoresist layer according to a third embodiment of the present disclosure.
Figure 9B:
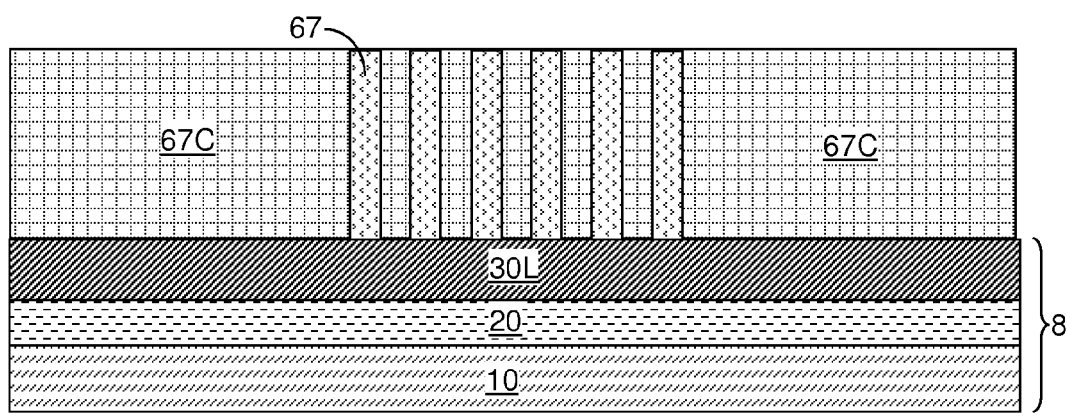
FIG. 9B is a vertical cross-sectional view of the third exemplary structure of FIG. 9A.

Referring to FIGS. 9A and 9B, a third exemplary structure according to a third embodiment of the present disclosure can be derived from the first exemplary structure of FIGS. 1A and 1B by substituting a blanket photoresist layer for a stack of an OPL 60, an ARC layer 62, and a blanket photoresist layer (See FIGS. 1A and 1B). The blanket photoresist layer is lithographically exposed to form a patterned photoresist layer 67, which is to remain after development on the top surface of the conductive material layer 30L, and a complementary photoresist layer 67C, which is to be removed during a subsequent development step. The photoresist layer (67, 67C) can include a positive tone photoresist or a negative tone photoresist.

The patterned photoresist layer 67 includes a lithographic pattern that includes a linear periodic array of lines having a uniform width in a region herein referred to as a randomly electrically disrupted connection region RDC, in which randomly electrically disrupted connections are subsequently formed. First non-periodic lines can be attached to a first end of each of the linear periodic array of lines. The first non-periodic lines can include portions wider than the linear periodic array of lines. Second non-periodic lines can be attached to a second end of each of the linear periodic array of lines. The second non-periodic lines can include portions wider than the linear periodic array of lines.

Figure 10A:
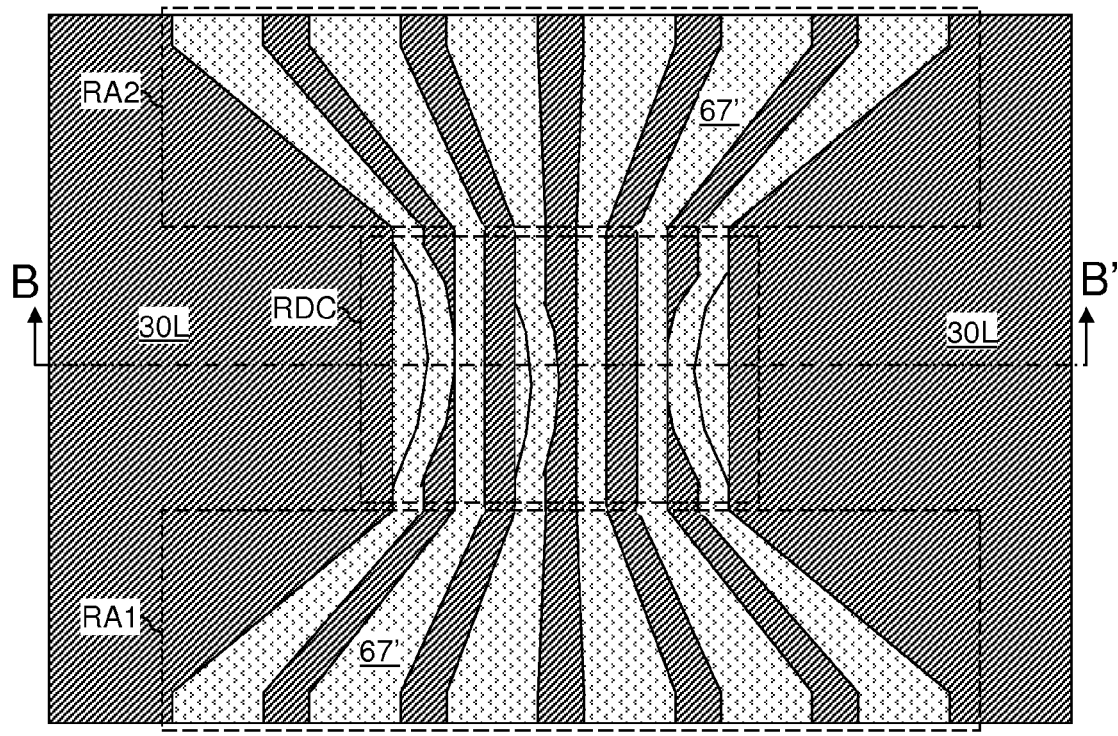
FIG. 10A is top-down view of the third exemplary structure after development of the lithographically exposed photoresist layer according to the third embodiment of the present disclosure.
Figure 10B:
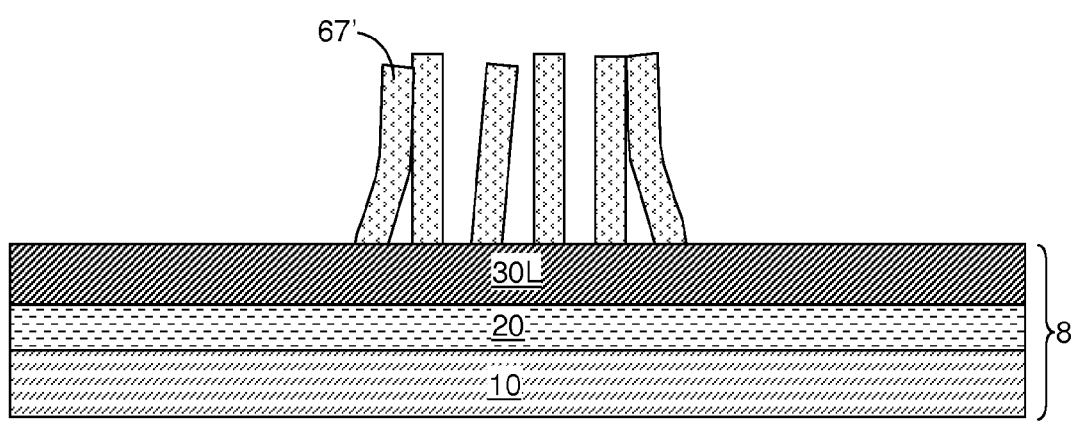
FIG. 10B is a vertical cross-sectional view of the third exemplary structure of FIG. 10A.

Referring to FIGS. 10A and 10B, the photoresist layer (67, 67C) is developed to remove the complementary photoresist layer 67C, while not removing the material of the patterned photoresist layer 67. Remaining portions of the photoresist layer (67, 67C), i.e., the patterned photoresist layer 67, randomly collapse in at least one location during development of the photoresist layer (67, 67C) to form a randomly collapsed photoresist layer 67'.

In one embodiment, at least one of the line portions of the patterned photoresist layer 67 within the randomly electrically disrupted connection region RDC does not collapse, i.e., stands as a structure having a shape of a rectangular parallelepiped or does not tilt to a degree to contact a neighboring line portion of the randomly collapsed photoresist layer 67'. In one embodiment, relevant processing parameters can be selected such that the portion of the randomly collapsed photoresist layer 67' having the uniform width within the randomly electrically disrupted connection region RDC has a random probability of collapse in a range from 10% to 80%. The relevant processing parameters can include, for example, the composition and viscosity of the photoresist material of the patterned photoresist layer 67, the height of the blanket photoresist layer (67, 67C), and the width of the line patterns within the randomly electrically disrupted connection region RDC as formed in the patterned photoresist layer 67.

Subsequently, the pattern in the randomly collapsed photoresist layer 67' is transferred into the conductive material layer 30L by an anisotropic etch that employs the randomly collapsed photoresist layer 67' as an etch mask. The collapsed portions of the randomly collapsed photoresist layer 67' within the randomly electrically disrupted connection region RDC prevent the underlying portions of the conductive material layer 30L from being etched. Thus, the transfer of the pattern in the randomly collapsed photoresist layer 67' into the conductive material layer 30L forms conductive material lines 30 as illustrated in FIGS. 4A and 4B. The conductive material lines 30 are conductors extending within a level defined between the top surface and the bottom surface of the conductive material layer 30L as provided at the processing steps of FIGS. 4A and 4B.

Optionally, a dielectric material layer 140L can be deposited over conductive material lines 30, i.e., the patterned portions of the conductive material layer 30L, and subsequently planarized, for example, by chemical mechanical planarization as illustrated in FIGS. 4A and 4B. The dielectric material layer 140L fills regions in which the conductive material layer 30L is not present. In other words, the dielectric material layer 140L and the conductive material layer 30L can complementarily fill a layer above the insulator layer 20L.

The third exemplary structure after formation of the conductive material lines 30 can have the same physical characteristics and functional characteristics as the first exemplary structure illustrated in FIGS. 4A and 4B.

Figure 11A:
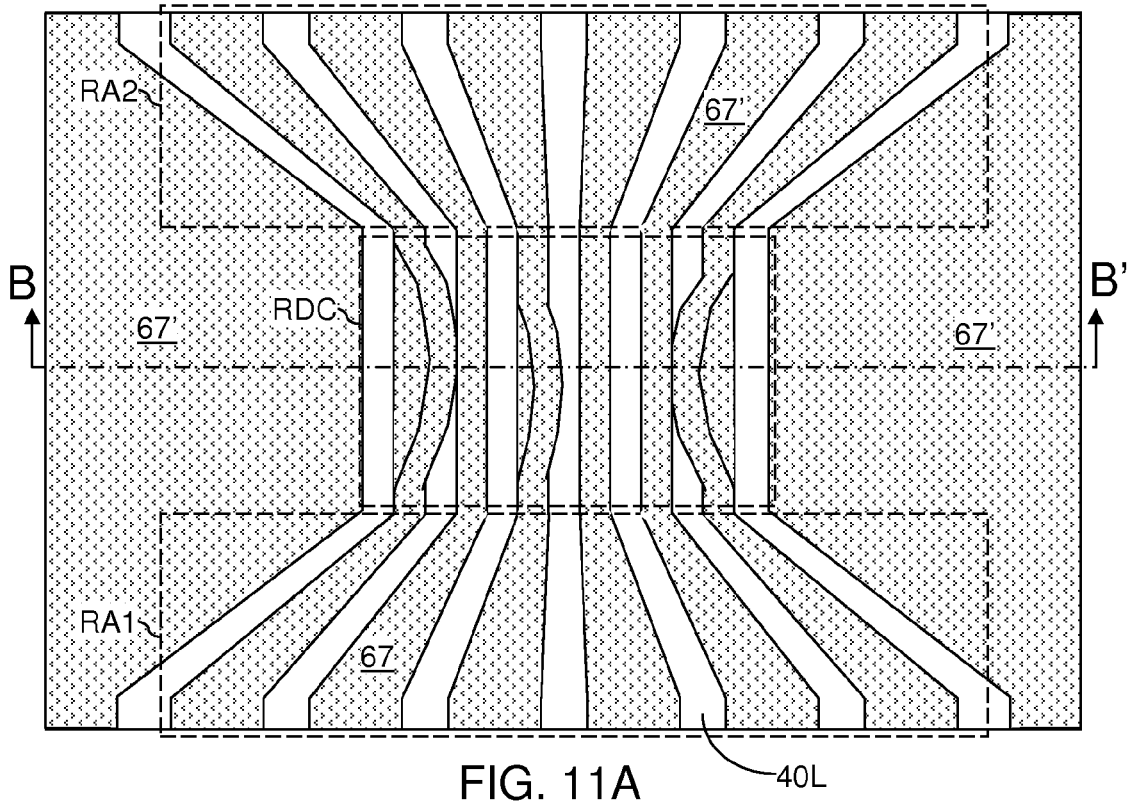
FIG. 11A is top-down view of a fourth exemplary structure after development of the lithographically exposed photoresist layer according to the fourth embodiment of the present disclosure.
Figure 11B:
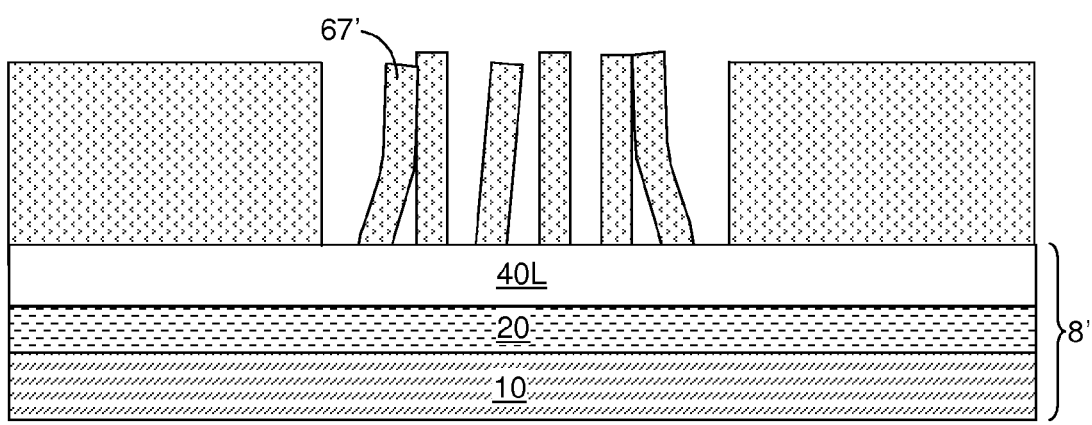
FIG. 11B is a vertical cross-sectional view of the fourth exemplary structure of FIG. 11A.

Referring to FIGS. 11A and 11B, a fourth exemplary structure according to the fourth embodiment of the present disclosure can be derived from the second exemplary structure of FIGS. 5A and 5B by substituting a blanket photoresist layer for a stack of an OPL 60, an ARC layer 62, and a blanket photoresist layer (See FIGS. 5A and 5B). The blanket photoresist layer is lithographically exposed to form a patterned photoresist layer, which is to remain after development on the top surface of the conductive material layer, and a complementary photoresist layer, which is to be removed during a subsequent development step. The blanket photoresist layer can include a positive tone photoresist or a negative tone photoresist.

The patterned photoresist layer includes a lithographic pattern that includes a linear periodic array of lines having a uniform width in a region herein referred to as a randomly electrically disrupted connection region RDC, in which randomly electrically disrupted connections are subsequently formed. First non-periodic lines can be attached to a first end of each of the linear periodic array of lines. The first non-periodic lines can include portions wider than the linear periodic array of lines. Second non-periodic lines can be attached to a second end of each of the linear periodic array of lines. The second non-periodic lines can include portions wider than the linear periodic array of lines.

The photoresist layer is developed to remove the complementary photoresist layer 67C, while not removing the material of the patterned photoresist layer. Remaining portions of the photoresist layer randomly collapse in at least one location during development of the photoresist layer to form a randomly collapsed photoresist layer 67'.

In one embodiment, at least one of the line portions of the patterned photoresist layer within the randomly electrically disrupted connection region RDC does not collapse, i.e., stands as a structure having a shape of a rectangular parallelepiped or does not tilt to a degree to contact a neighboring line portion of the randomly collapsed photoresist layer 67'. In one embodiment, relevant processing parameters can be selected such that the portion of the randomly collapsed photoresist layer 67' having the uniform width within the randomly electrically disrupted connection region RDC has a random probability of collapse in a range from 10% to 80%. The relevant processing parameters can include, for example, the composition and viscosity of the photoresist material of the patterned photoresist layer, the height of the blanket photoresist layer, and the width of the line patterns within the randomly electrically disrupted connection region RDC as formed in the patterned photoresist layer.

Subsequently, the pattern in the randomly collapsed photoresist layer 67' is transferred into the dielectric material layer 40L by an anisotropic etch that employs the randomly collapsed photoresist layer 67' as an etch mask. The collapsed portions of the randomly collapsed photoresist layer 67' within the randomly electrically disrupted connection region RDC prevent the underlying portions of the conductive material layer 30L from being etched.

The patterned dielectric material layer 40 includes cavities, i.e., trenches, in areas in which the organic planarizing material of the randomly collapsed photoresist layer 67' is not present during the anisotropic etch that performs the pattern transfer. The collapsed portions of the randomly collapsed photoresist layer 67' within the randomly electrically disrupted connection region RDC prevent the underlying portions of the dielectric material layer 40L from being etched, i.e., prevents formation of a contiguous cavity underneath. Formation of the cavities (trenches) within the dielectric material layer 40L provides a patterned dielectric material layer 40 including cavities as illustrated in FIGS. 7A and 7B.

Subsequently, the processing steps of FIGS. 8A and 8B are performed. The fourth exemplary structure after formation of the conductive material lines 50 can have the same physical characteristics and functional characteristics as the second exemplary structure illustrated in FIGS. 8A and 8B.

Figure 12:
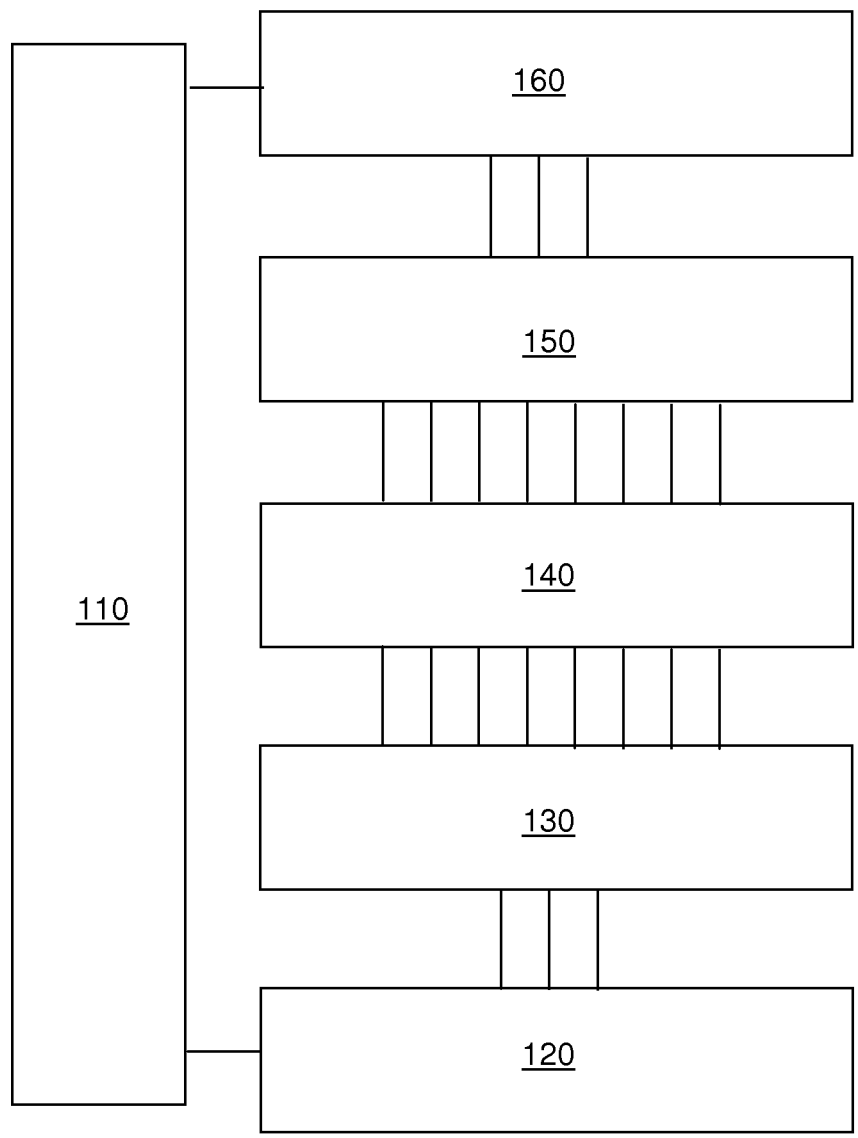
FIG. 12 is a schematic view of an electronic system of the present disclosure.

Referring to FIG. 12, an exemplary electronic system of the present disclosure is schematically illustrated in a block diagram. The exemplary electronic device of the present disclosure includes an electrical connection structure, which can be implemented as any of the first, second, third, and fourth exemplary structures described above or any combination of the above in a parallel connection, in a series connection, or in a combination of at least one parallel connection and at least one series connection. For example, the electronic connection structure can be implemented as one or more instances of the conductive material lines 30 illustrated in FIGS. 4A and 4B, and/or one or more instances of the conductive material lines 50 as illustrated in FIGS. 8A and 8B.

The exemplary electronic system further includes a multiplexer 130 and a demultiplexer 150. The multiplexer 130 provides electrical connections to the portions of the conductive material lines (30 in FIGS. 4A and 4B or 50 in FIGS. 8A and 8B) in the first access node region RA1 such that each conductive material line (30 or 50) can be accessed by the multiplexer 130. Specifically, the output nodes of the multiplexer 130 can be connected to the first access conductive material lines, i.e., portions of the conductive material lines (30 or 50) within the first access node region RA1 of any of the first, second, third, and fourth exemplary structures (See FIGS. 4A, 4B, 8A, and 8B). The input nodes of the demultiplexer 150 are connected to the second access conductive material lines, i.e., portions of the conductive material lines (30 or 50) within the second access node region RA2 of any of the first, second, third, and fourth exemplary structures (See FIGS. 4A, 4B, 8A, and 8B).

The exemplary electronic system can further include a serial test signal generator 120 configured to generate test signals for sequentially accessing each of the first access nodes through the multiplexer 130, and a signal measurement device 160 configured to measure electrical signals at the second access nodes while the test signals are applied to the first access nodes.

In addition, the exemplary electronic system can optionally include a test controller 110, which is configured to provide commands to the serial test signal generator 120 to generate test signals necessary for testing electrical shorts and/or electrical opens within the conductive material lines (30 or 50) within the electrical connection structure 140. Further, the test controller 110 may be configured to receive, and analyze, the measurement signals as collected at the signal measurement device 160, and to determine presence or absence of electrical shorts between any physically neighboring pair of conductive material lines 30 in the first or third exemplary structure, or presence or absence of electrical opens within any conductive material line 50 in the second or fourth exemplary structures.

The entirety of the exemplary electronic system can be implemented by forming semiconductor devices on the substrate (8 or 8') that implements the first, second, third, or fourth exemplary structure. Specifically, various devices for generating test signals and measuring and testing the measurement signals can be implemented employing field effect transistors or other semiconductor devices formed on the substrate (8 or 8') that implements the first, second, third, or fourth exemplary structure.

The various exemplary structures of the present disclosure provide secure electronic systems in which a code for authentication may be stored. The code for authentication is embodied in the random electrical shorts or random electrical opens that are present in the conductive material lines (30 or 50), which is a unique physical identifier (or code) fabricated within the electronic structure. The secure electronic structure of the present disclosure retains the unique code. If a non-authentic electronic structure intended to mimic the electronic structure of the present disclosure is employed to breach security features, a program configured to verify the stored code can detect discrepancy, and any digital code intending to be run on the system will not be executed. As needed, the electronic structure or integrated circuit including the secure electronic system of the present disclosure may be disabled.

In the present disclosure, the secrets of the electronic structure are not stored in binary form when the electronic structure is powered down, but are hidden in the formed of unique identifiers (i.e., PUFs) within the electronic structure itself. A unique physical identifier or fingerprint thus can exist on every chip due to inherently random variations. These random variations can be utilized as a unique physical identifier of each integrated circuit.

The electronic structure of the present disclosure which includes the PUF can be made utilizing standard semiconductor manufacturing methods and materials without addition of any additional processing steps, or with addition of a minimal number of processing steps. Also, the electronic structure of the present disclosure has the following characteristics: (i) reliability to avoid bit errors: The electronic structure of the present disclosure is stable and the PUF value does not drift significantly over time and temperature. (ii) Random variability: Variability of the electronic structure of the present disclosure is significant enough to enroll millions of electronic structures to give each a unique code and the PUF values are random to avoid would be attackers, i.e., hackers, from guessing specific patterns. Variability is also important to the PUF stability to avoid bit errors. (iii) Tamper response: The PUF within the electronic structure of the present disclosure is destroyed or erased in response to a tampering event.

The electronic structure can be formed atop a semiconductor substrate including at least one semiconductor device, i.e., transistor, resistor, capacitor, diode, and BiCMOS, located thereon providing an integrated circuit of the present disclosure. The electronic structure of the present disclosure can be conveniently fabricated during standard BEOL interconnect processing.

While the present disclosure has been particularly shown and described with respect to preferred embodiments thereof, it will be understood by those skilled in the art that the foregoing and other changes in forms and details may be made without departing from the spirit and scope of the present disclosure. It is therefore intended that the present disclosure not be limited to the exact forms and details described and illustrated, but fall within the scope of the appended claims.

What is claimed is:

1. An electronic structure comprising an electrical connection structure located in a substrate, said electrical connection structure containing:
   a randomly electrically disrupted connection region including a plurality of randomly electrically disrupted conductive material lines, said plurality of randomly electrically disrupted conductive material lines comprising at least one variable-width conductive material line extending generally along a lengthwise direction;
   a first access node region including first access conductive material lines configured to access one end of each of said plurality of randomly electrically disrupted conductive material lines and not including electrical shorts therein; and
   a second access node region including second access conductive material lines configured to access another end of each of said plurality of randomly electrically disrupted conductive material lines and not including electrical shorts therein.

2. The electronic structure of claim 1, wherein said plurality of randomly electrically disrupted conductive material lines is embedded within a dielectric material layer located in said substrate.

3. The electronic structure of claim 1, wherein said plurality of randomly electrically disrupted conductive material lines further comprises at least one uniform-width conductive material line extending along said lengthwise direction, and wherein said at least one variable-width conductive material line includes portions having a greater width than a width of said at least one uniform-width line.

4. The electronic structure of claim 3, wherein an interface region between said randomly electrically disrupted connection region and said first access node region includes a periodic repetition of end portions of said plurality of randomly electrically disrupted conductive material lines.

5. The electronic structure of claim 4, wherein said periodic repetition of end portions of said plurality of randomly electrically disrupted conductive material lines has a same width as said at least one uniform-width conductive material line.

6. The electronic structure of claim 4, wherein an interface region between said randomly electrically disrupted connection region and said second access node region includes a periodic repetition of additional end portions of said plurality of randomly electrically disrupted conductive material lines.

7. The electronic structure of claim 1, further comprising:
   a multiplexer, wherein output nodes of said multiplexer are connected to said first access conductive material lines; and
   a demultiplexer, wherein input nodes of said demultiplexer are connected to said second access conductive material lines.

8. The electronic structure of claim 7, further comprising:
   a serial test signal generator configured to generate test signals for sequentially accessing each of said first access nodes through said multiplexer; and
   a signal measurement device configured to measure electrical signals at said second access nodes while said test signals are applied to said first access nodes.

9. The electronic structure of claim 1, wherein said first access conductive material lines and said second access conductive material lines have a greater width in regions distal from said randomly electrically disrupted connection region than in regions proximal to said randomly electrically disrupted connection region.

* * * * *